United States Patent [19]

Seki et al.

[11] 3,997,561

[45] Dec. 14, 1976

[54] PRESSURE SENSITIVE COPYING PAPER

[75] Inventors: Hiromitsu Seki; Kenji Yamamoto, both of Oosaka, Japan

[73] Assignee: Yamamoto Kagaku Gosei Kabushiki Kaisha, Japan

[22] Filed: Dec. 15, 1971

[21] Appl. No.: 208,415

[30] Foreign Application Priority Data

Dec. 15, 1970 Japan .............................. 45-112053

[52] U.S. Cl. ............................... 260/335; 427/151
[51] Int. Cl.$^2$ ........................................ C07D 493/10
[58] Field of Search .................................... 260/335

[56] References Cited

UNITED STATES PATENTS

| 2,031,023 | 2/1936 | Wyler | 260/336 |
|---|---|---|---|
| 3,442,908 | 5/1969 | Orita et al. | 260/335 |
| 3,506,471 | 4/1970 | Kimura et al. | 260/335 |
| 3,514,311 | 5/1970 | Katayama et al. | 260/335 |
| 3,649,649 | 3/1972 | Orita et al. | 260/335 |
| 3,691,203 | 9/1972 | Koga et al. | 260/335 |

FOREIGN PATENTS OR APPLICATIONS 1,018,793  2/1966  United Kingdom ............... 260/336

OTHER PUBLICATIONS

Chemical Abstracts, vol. 24 (1930) p. 37808.

*Primary Examiner*—Norma S. Milestone
*Attorney, Agent, or Firm*—Armstrong, Nikaido & Wegner

[57] ABSTRACT

An excellent pressure sensitive copying paper is provided by applying as a color former certain encapsulated 6-di lower alkyl amino-naphthalfluoran compounds to either a single sheet or to the upper leaf of a pressure sensitive paper. The color former is soluble in aromatic solvents and also has excellent light fastness.

7 Claims, No Drawings

PRESSURE SENSITIVE COPYING PAPER

BACKGROUND OF THE INVENTION

Basically, pressure sensitive copying paper consists of two sheets of paper, the lower surface of the upper leaf having applied thereto minute capsules containing a color reactive achromatic substance (hereinafter called a "color former") dissolved in a low volatile solvent and the upper surface of the lower leaf being coated with a solid acid, such as acid clay, zeolite, bentonite, attapulgite & phenolic compounds, etc. When the lower surface of the upper leaf and the upper surface of the lower leaf are put together and pressure is applied to the upper surface of the upper leaf by handwriting or typing, the capsules under pressure are broken and the color former contained therein is adsorbed by the solid acid on the upper surface of the lower leaf to develop a color, thus providing a copy.

There is also a type of pressure sensitive copying paper having a mechanism to develop a color when a regional pressure is exerted upon a sheet of paper holding capsules, which contain a color former, and a solid acid on or within it. However, such type is quite similar to the first-mentioned pressure sensitive copying paper (consisting of two sheets of paper, an upper and lower leaf) with respect to the mechanism of developing a color, and thus the same color former can be used for both types. And any of the above-mentioned facts belongs to the prior-known arts.

Conventionally, a number of compounds have been known to be useful as the color former, such as lactones, i.e. crystal violet lactone and malachite green lactone; thiazine compounds, i.e. benzoyl leucomethylene blue; and other leucoauramine and spiropyran compounds, and others. They have made it possible to manufacture various kinds of products which develop such colors as ranging from yellow and red to blue, green and black. However, the light resistance after development of color, particularly when inorganic substances such as acid clay, Silton (manufactured and soled by Mizusawa Chemical Company Ltd.), etc. are used as the solid acid, has been unsatisfactory, so that it has been hoped for to find out some solution for this defect. It is only benzoyl leucomethylene blue that shows a satisfactory light resistance, but it develops a color at a very low speed. Therefore it can not be used for practical purposes, unless it is mixed with some other color former which develops a color at a higher speed. Even this mixed use offers much inconvenience from a practical point of view, since benzoyl leucomethylene blue, which develops a blue color, imposes a restriction on the variety.

SUMMARY

In accordance with the invention, an excellent pressure sensitive copying paper can be obtained by using a new and novel color former which distinguish himself in the speed of color development, and the shade of the color, the simplicity of the manufacturing method and the light resistance of the color developed.

The color former used in the present invention can be represented by the following general formula (I).

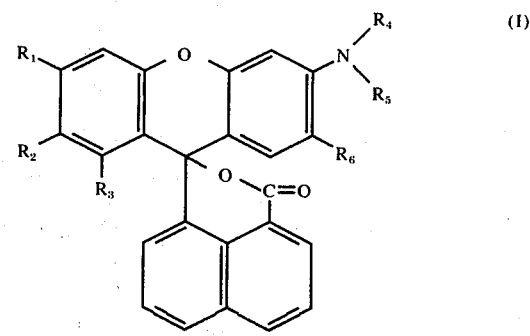

wherein $R_1$, $R_2$ and $R_3$ represent hydrogen, methyl or halogen, $R_4$ and $R_5$ represent hydrogen, methyl or ethyl groups, and $R_6$ represents hydrogen, methyl, amino or acetyl-amino groups, also $R_2$ and $R_3$ when joined together represent a hydrocarbon residue which forms a benzene ring, in which case the following formula (II) will be given instead of formula (I).

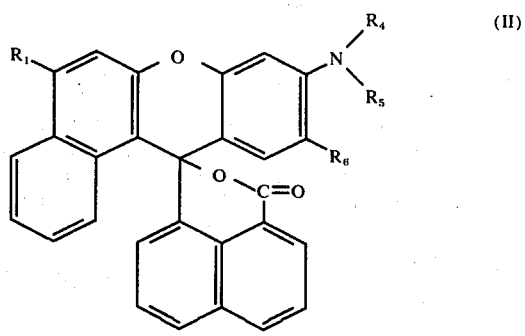

That is to say, we have found that the fluoran compounds which have a naphthalene ring in the structure of the lactone ring can become a color former with an excellent light resistance and that they can be readily synthesized by the process shown by the following reaction formula.

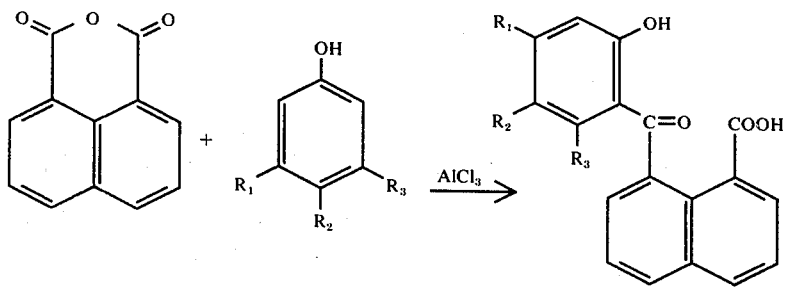

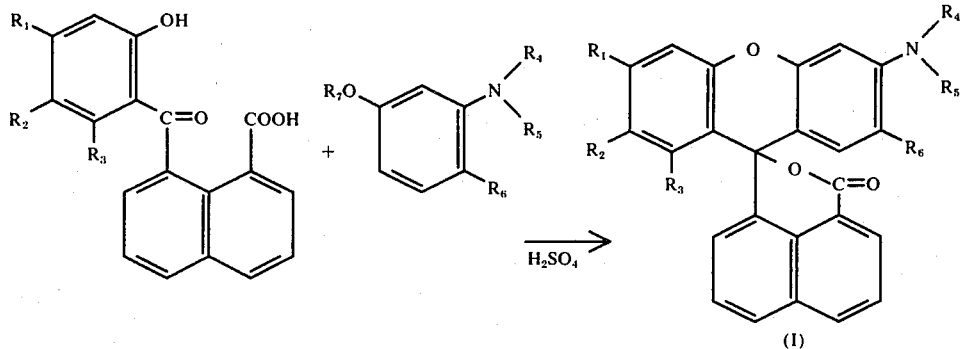

DETAILED DESCRIPTION

The following are typical examples of the novel color former.

3-methyl-6-ethylamino-7-methylnaphthalfluoran (III)

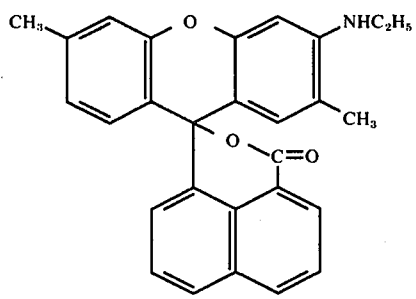

(III) is light brown crystal obtained by condensing 8-(4'-methyl-2'-hydroxybenzoyl)-α-naphthoic acid (which is obtained by condensing naphthalic anhydride and methacresol through Friedel-Crafts reaction) and 2-ethylaminoparacresol in sulfuric acid and having a melting point of 119° to 120° C. It develops an orange color, reacting with a solid acid, and has a very good light resistance after developing into the color.

2-methyl-6-ethylamino-7-methylnaphthalfluoran (IV)

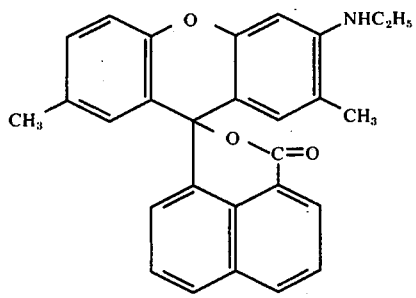

(IV) is light reddish brown crystal obtained by condensing 8-(5'-methyl-2'-hydroxy-benzoyl)-α-naphthoic acid (which is obtained by condensing naphthalic anhydride and paracresol through Friedel-Crafts reaction) and 2-ethylaminoparacresol in sulfuric acid and having a melting point of 187° to 192° C. It develops a yellowish orange color reacting with a solid acid, and has an excellent light resistance after developing into the color.

2-chloro-3-methyl-6-ethylamino-7-methylnaphthalfluoran (V)

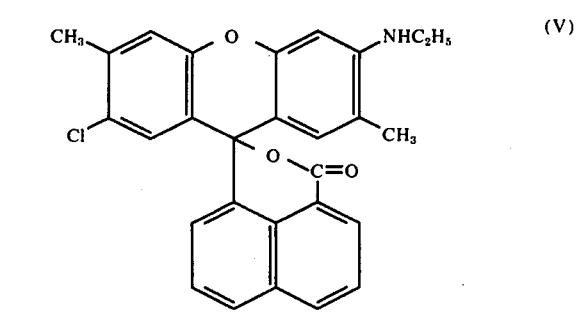

(V) is light reddish brown crystal obtained by condensing 8-(4'-methyl-5'-chloro-2'-hydroxybenzoyl)-α-naphthoic acid (which is obtained by condensing naphthalic anhydride and 2-chloromethacresol through Fridedel-Crafts reaction) and 2- ethylaminoparacresol in sulfuric acid and having a melting point of 160°–165° C. It develops a yellowish orange color reacting with a solid acid, and has a remarkably excellent light resistance after developing into the color.

3-chloro-6-ethylamino-7-methylnaphthalfluoran (VI)

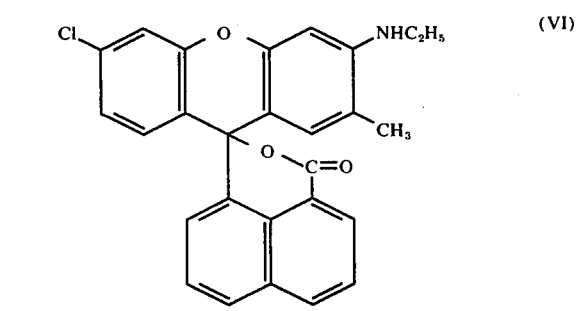

(VI) is light reddish brown crystal obtained by condensing 8-(4'-chloro-2'-hydroxy-benzoyl)-α-naphthoic acid (which is obtained by condensing naphthalic anhydride and methachlorophenol through Friedel-Crafts reaction) and 2-ethylaminoparacresol in sulfuric acid and having a melting point of 167° to 170° C. It develops a yellowish orange color reacting with a solid acid, and has an excellent light resistance after developing into the color.

1,2-benzo-6-ethylamino-7-methylnaphthalfluoran (VII)

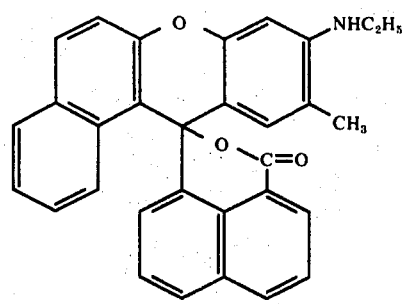

(VII) is light ocherous crystal obtained by condensing 8-(2'-hydroxynaphthoyl)-α-naphthoic acid (which is obtained by condensing naphthalic anhydride and β-naphthol through Friedel-Crafts reaction) and 2-ethylaminoparacresol in sulfuric acid and having a melting point of 210° to 214° C. It develops a black or blackish green color, reacting with a solid acid, and has an excellent light resistance after developing into the color.

3-methyl-6-diethylaminonaphthalfluoran (VIII)

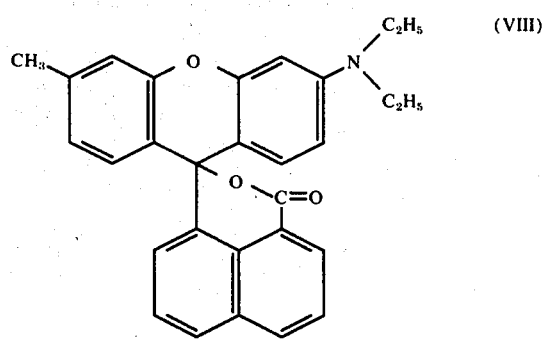

(VIII) is light brown crystal obtained by condensing 8-(4'-methyl-2'-hydroxybenzoyl)-α-naphthoic acid (See the description about (III) and methadiethylaminophenol in sulfuric acid and having a melting point of 170° to 174° C. It develops a reddish purple color, reacting with a solid acid, and has an excellent light resistance after developing into the color.

Now the present invention is further illustrated by the following examples.

EXAMPLE 1

60 g of gelatin and 60 g of gum arabic were dissolved in 50 ml of water of 40° C. On the other hand, 1.2 g of 3-methyl-6-ethylamino-7-methylnaphthalfluoran (III) was dissolved in 120 g of diphenyl chloride, and then this solution was added to the above-mentioned aqueous solution of gelatin and gum arabic and perfectly dispersed into an emulsion by a homomixer. Water of 50° C was added until its volume became 2,000 ml in total, followed by 90 ml of 10 per cent acetic acid. While stirring, water of 50° C was further added until the total weight became 4 kg, and the stirring was continued for a period of an hour. While still stirring, the solution was cooled down to below 10° C with ice water, and 10 per cent caustic soda was added until a pH of 9 was reached and gradually returned to room temperature. The product was applied onto the lower surface of the upper leaf and dried. On the other hand, a solid acid such as acid clay or phenolic compounds, was applied onto the upper surface of the lower leaf.

When copying was carried out with the upper and lower leaves thus prepared, an orange image developed, which showed an excellent light resistance.

EXAMPLE 2

1.2 g of 2-methyl-6-ethylamino-7-methylnaphthalfluoran (IV) was dissolved in 120 g of diphenyl chloride, then the solution thus prepared was treated in the same way as in Example 1 to obtain an aqueous dispersion of minute capsules. This was sprayed and dried into a powder of minute capsules, which was mixed with and dispersed in a 4 per cent xylene solution of p-phenylphenol formaldehyde condensate. And this dispersed solution was applied onto a sheet of paper and dried. When a regional pressure was exerted on this sheet of paper, it immediately developed a yellowish orange image, which showed an excellent light resistance.

EXAMPLE 3

1.2 g of 2-chloro-3-methyl-6-ethylamino-7-methylnaphthalfluoran (V) was dissolved in 120 g of diphenyl chloride. By treating this solution in the same way as in Example 1, an aqueous dispersion of minute capsules was obtained. This was mixed with 8 g of fine powder of p-phenylphenol formaldehyde condensate to disperse the latter therein, and further 40 g of pulp was added thereto. Then the dispersion was diluted with water until the final solid content became 0.5 per cent. Then the product was run onto a Fourdrinier screen to be made into a sheet of paper. When this sheet of paper was subjected to a regional pressure, it immediately developed a reddish orange image, which showed an excellent light resistance.

EXAMPLE 4

60 g of gelatin and 60 g/gum arabic were dissolved /of 50 ml of water of 40° C. On the other hand, 1.0 g of 3-chloro-7-acetylaminonaphthalfluoran (VIII) was dissolved in 120 g of diphenyl chloride, and then this solution was added to the above-mentioned aqueous solution of gelatin and gum arabic and perfectly dispersed into an emulsion by a homo-mixer. Water of 50° C was added until its volume became 2,000 ml in total, followed by 90 ml of 10 per cent acetic acid. While stirring, water of 50° C was further added until the total weight became 4 kg, and the stirring was continued for a period of an hour. While still stirring, the solution was cooled down to below 10° C with ice water, and 10 per cent caustic soda was added until a pH of 9 was reached and gradually returned to room temperature. The product was applied onto the lower surface of the upper leaf and dried. On the other hand, a solid acid such as acid clay or phenolic compounds, was applied onto the upper surface of the lower leaf.

When copying was carried out with the upper and lower leaves thus prepared, an bluish green image developed, which showed an excellent light resistance.

EXAMPLE 5

1.0 g of 3-chloro-7-acetylaminonaphthalfluoran (VIII) was dissolved in 120 g of diphenyl chloride, then the solution thus prepared was treated in the same way as in Example 4 to obtain an aqueous dispersion of minute capsules. This was sprayed and dried into a powder of minute capsules, which was mixed with and dispersed in a 4 per cent xylene solution of p-phenylphenol formaldehyde condensate. And this dispersed solution was applied onto a sheet of paper and dried. When a regional pressure was exerted on this sheet of paper, it developed a bluish green image, which showed an excellent light resistance.

EXAMPLE 6

1.0 g of 3-chloro-7-acetylaminonaphthalfluoran (VIII) was dissolved in 120 g of diphenyl chloride. By treating this solution in the same way as in Example 4, an aqueous dispersion of minute capsules was obtained. This was mixed with 8 g of fine powder of p-phenylphenol formaldehyde condensate to disperse the latter therein, and further 40 g of pulp was added thereto. Then the dispersion was diluted with water until the final solid content become 0.5 per cent. Then the product was run onto a Fourdrinier screen to be made into a sheet of paper. When this sheet of paper was subjected to a regional pressure, it developed a bluish green image, which showed an excellent light resistance.

Although an aromatic solvent was used as a solvent in the foregoing examples, the same pressure sensitive copying paper can be obtained without problem with the use of other aromatic solvent. Other aromatic solvents of low volatility include lower alkyl diphenyls, such as methyl-, ethyl- and propyl diphenyl, and higher alkyl benzenes, such as dodecyl-, decyl- and octyl benzene, having a boiling point of above 150° C. If the boiling point of the solvent is at least 150° C, it has sufficient low volatility according to the invention.

The solid acid functions as an electron acceptive adsorbent. In lieu of those used in the previous examples zeolite, bentonite, attapulgite and Silton (manufactured and saled by Mizusawa Chemical Company) can be used with excellent results.

What is claimed is:

1. A fluoran compound represented by the following general formula:

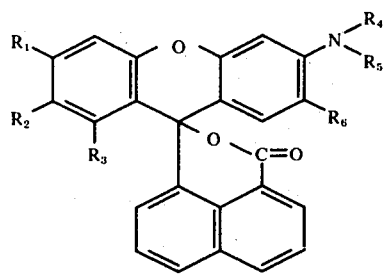

wherein $R_1$, $R_2$ and $R_3$ are members selected from the group consisting of hydrogen, methyl, and halogen; $R_4$ and $R_5$ are members selected from the group consisting of hydrogen, methyl, and ethyl; and $R_6$ is a member selected from the group consisting of hydrogen, methyl, amino and acetylamino; but $R_2$ and $R_3$ may cooperate to form a phenyl nucleus.

2. A fluoran compound of claim 1 which is 3-methyl-6-ethylamino-7-methylnaphthalfuoran.

3. A fluoran compound of claim 1 which is 2-methyl-6-ethylamino-7-methylnaphthalfluoran.

4. A fluoran compound of claim 1 which is 2-chloro-3-methyl-6-ethylamino-7-methylnaphthalfluoran.

5. A fluoran compound of claim 1 which is 3-chloro-6-ethylamino-7-methylnaphthalfluoran.

6. A fluoran compound of claim 1 which is 1,2-benzo-6-ethylamino-7-methylnaphthalfluoran.

7. A fluoran compound of claim 1 which is 3-methyl-6-diethylaminonaphthalfluoran.

* * * * *